No. 753,052. PATENTED FEB. 23, 1904.
P. F. DUNDON.
TIMBER TREATING PROCESS.
APPLICATION FILED DEC. 13, 1902.
NO MODEL.
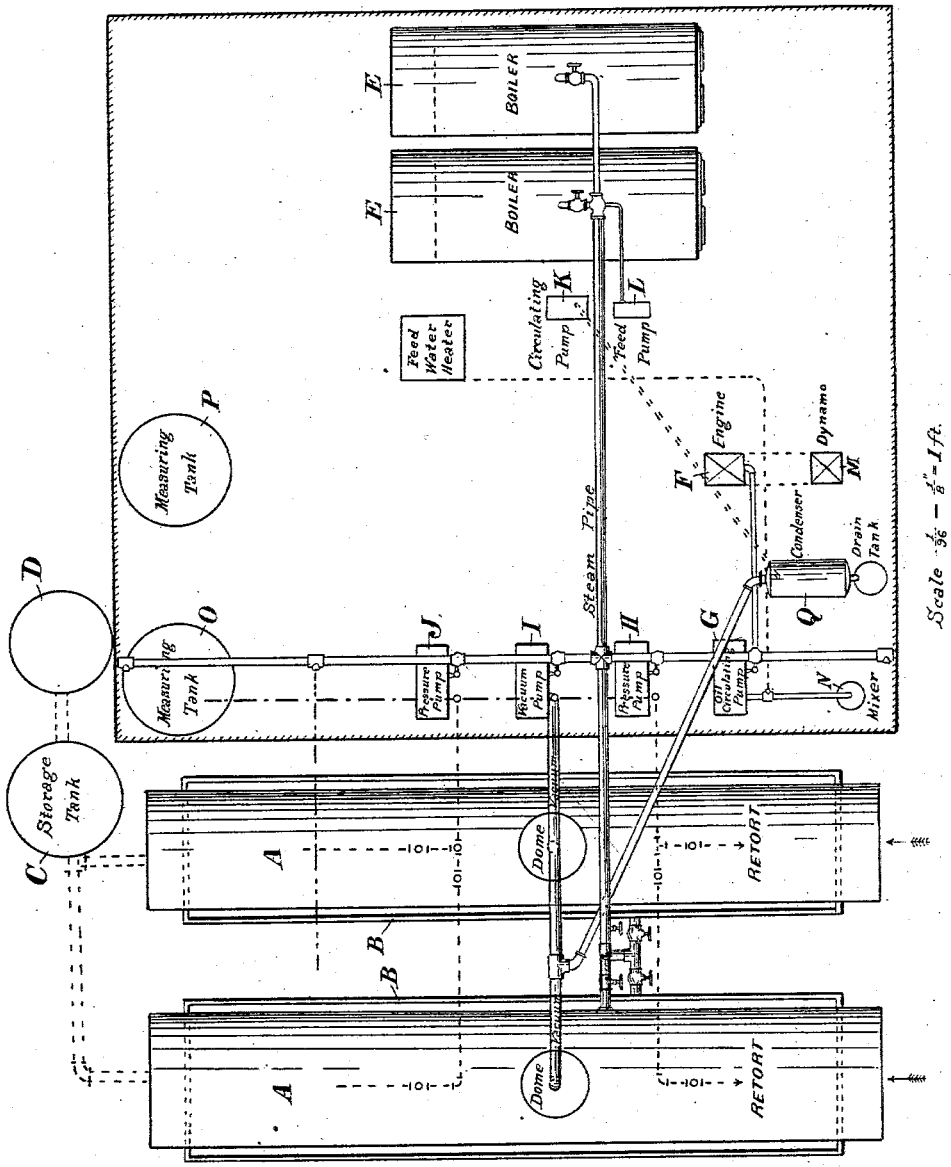
WITNESSES:
INVENTOR:

No. 753,052. Patented February 23, 1904.

UNITED STATES PATENT OFFICE.

PATRICK F. DUNDON, OF SAN FRANCISCO, CALIFORNIA.

TIMBER-TREATING PROCESS.

SPECIFICATION forming part of Letters Patent No. 753,052, dated February 23, 1904.

Application filed December 13, 1902. Serial No. 135,115. (No specimens.)

*To all whom it may concern:*

Be it known that I, PATRICK F. DUNDON, a citizen of the United States, residing at San Francisco, county of San Francisco, and State of California, have invented certain new and useful Improvements in Timber-Treating Processes; and I hereby declare the following to be a full, clear, and exact description of the same, reference being had to the accompanying drawing, forming a part of this specification.

This invention relates to an improved process for treating structural timber to preserve it from decay and the ravages of worms when submerged in water, buried in the earth, or exposed to the weather.

My improvement consists in a double treatment, or treatment in stages, whereby the interior pores of the timber are filled with a limpid preservative liquid and the outer strata with a viscid hardening substance that will retain the interior filling in its natural state and preserve it from the action of sea-water, moisture, or other causes that tend to dissipate, harden, and change the nature of the interior or active substance.

To better explain the manner of operating, I append to this specification a plan-diagram of a plant containing the various machines and apparatus employed in carrying out my improved process.

Referring to the diagram, A A are the retorts in which the timber is treated.

B B are vats into which the retorts are drained.

C is an elevated tank containing crude petroleum-oil or other liquid to be forced into the interior of the timber, and D a tank containing bitumen or asphaltum in a viscous solution. Both of these tanks are connected by pipes to the retorts A A and to pumps that move the fluids.

E E are steam-boilers supplying heat to the retorts A A and elsewhere required; also, power to various engines and steam-pumps F, G, H, I, J, K, and L, and to machines, such as a dynamo M and mixer N.

The measuring-tanks O and P are interposed in the circuit of the oils from and to the tanks C and D, so as to determine the amount of oil and pitch taken up by the timber in the retorts A A.

The mixer N is employed to produce by agitation homogeneity of the substances injected into the timber. The condenser Q is to liquefy the vapors that arise from the timber in the first or drying process and to save any by-products therefrom.

The various pipes and conduits for the liquid substances are not shown in the drawing because these depend on the disposition of the plant, which can be arranged in various ways and will be understood by any one skilled in the art of timber-treating processes.

The substances found most suitable are respectively crude petroleum-oil and mineral bitumen or asphaltum, these being readily obtained at a low price, remaining fixed or in their natural state for a long time, and found to conserve the objects in view—namely, interior saturation with a limpid substance preservative in nature and repellent to worms and insects and an impervious exterior stratum or coating of a fixed bituminous substance that repels moisture or other agents that would change or neutralize the active nature of the limpid interior substance.

I am aware that a great many substances, including petrolic oils of various kinds, have been injected into the pores of timber to obtain the same objects to which my invention is directed. Also that two or more substances have been employed together or consecutively for like purposes, but not a chemically active substance within and one to mechanically protect it without and maintain the active inner one in the pores of the timber. The process by which I attain these ends is performed as follows: The timber to be treated is placed in strong metallic retorts having an internal system of manifold or coil steam-heating pipes disposed beneath or around the timber, but not communicating with the interior of the retort. At the ends of the retorts are sealed doors through which the timber is inserted and removed, the whole construction made to resist internal pressure in the usual manner of such apparatus.

In the case of heavy timbers or when a large quantity of timber is treated at one time I employ the well-known means of a railway and suitable cars or trucks that can be run into the retorts through doors at the ends and there remain while the timber is being treated.

When a charge of timber is placed in the retort and the latter is closed and sealed, live steam is admitted to the interior in direct contact with the timber. Steam also is admitted to the manifolds or coils of heating-pipes, raising the temperature within the retorts to approximately 250° Fahrenheit scale. This operation expands the fiber and opens the pores of the wood by heat and expansion. The native sap is driven out and, with the condensed water, is permitted to escape through the bottom of the retorts, regulated by suitable valves or cocks. When the timber has been exposed to this treatment for a sufficient length of time—usually from one to three hours, according to its thickness or section—steam is shut off from the interior of the retort and from direct contact with the timber, but is continued in the manifolds or coils. A valve in the top of the retort is then opened to permit the escape of vapor caused by the drying-heat. This operation is continued until the escaping vapor contains no moisture and the timber is dry, or the vacuum-pump may be applied to draw the vapors and moisture off and convey them through the condenser. Thus far the operation is the same as that practiced in preparing timber for treatment by the most approved apparatus. The retorts are then closed and filled with the limpid mineral oil commonly called "crude petroleum" or other suitable equivalent, and pressure is applied thereto by means of a pump or other forcing apparatus, and the contents are heated by the internal pipes until the temperature reaches about 220° Fahrenheit, approximately. The pressure and heat is maintained until the oil has penetrated to the heart of the timber and has filled all its pores, the time required being in proportion to the size and section of the timber—approximately half an hour for each inch of diametric cross-section. Pressure is then removed from the retorts, the limpid oil is drained off, and the retorts are filled with melted bituminous pitch, commonly asphaltum. Heat and pressure are again applied, and the limpid oil that had to some extent exuded under a relief of pressure is forced back into the interior of the timber and the outer stratum of the wood is filled with the viscous bituminous substance, that closes and seals the pores and becomes fixed therein, forming an impervious coating that retains the interior limpid oil in its natural state and properties.

Having thus explained the nature and objects of my invention, I do not claim the injection into timber of preserving substances of any specific nature when uniformly diffused therethrough; but

What I claim, and desire to secure by Letters Patent, is—

The process of treating timber for preservative purposes which consists in first opening the pores and expelling the native sap by means of steam heat, moisture and pressure; second, drying out the contained moisture; third, treating the timber with a limpid mineral oil under heat and pressure to fill the pores of the interior or heart portion, and, fourth, treating the timber with a bituminous pitch under heat and pressure to fill the pores of the outer stratum, whereby the latter is sealed to form an impervious coating for the conservation of the limpid interior substance, substantially as specified.

In testimony whereof I have signed my name to this specification in the presence of two subscribing witnesses.

PATK. F. DUNDON.

Witnesses:
A. W. GRANT,
P. W. J. LANDER.